United States Patent
Shechter

(10) Patent No.: US 7,809,100 B2
(45) Date of Patent: Oct. 5, 2010

(54) REBINNING FOR COMPUTED TOMOGRAPHY IMAGING

(75) Inventor: Gilad Shechter, Haifa (IL)

(73) Assignee: Koninklijke Philips Electronics N.V., Eindhoven (NL)

(*) Notice: Subject to any disclaimer, the term of this patent is extended or adjusted under 35 U.S.C. 154(b) by 470 days.

(21) Appl. No.: 12/065,283

(22) PCT Filed: Aug. 18, 2006

(86) PCT No.: PCT/IB2006/052863
§ 371 (c)(1),
(2), (4) Date: Feb. 29, 2008

(87) PCT Pub. No.: WO2007/026273
PCT Pub. Date: Mar. 8, 2007

(65) Prior Publication Data
US 2008/0247507 A1    Oct. 9, 2008

Related U.S. Application Data

(60) Provisional application No. 60/596,150, filed on Sep. 2, 2005.

(51) Int. Cl.
*A61B 6/03* (2006.01)
(52) U.S. Cl. .......................... 378/4; 378/901
(58) Field of Classification Search .......... 378/4, 378/901
See application file for complete search history.

(56) References Cited

U.S. PATENT DOCUMENTS 6,324,241 B1    11/2001  Besson
7,505,553 B2 *  3/2009  Bruder et al. .......... 378/11
2003/0223533 A1   12/2003  Hsieh

OTHER PUBLICATIONS

Kachelriess et al., Extended parallel backprojection for standard three-dimensional and phase-correlated four-dimensional axial and spiral cone-beam CT with arbitrary pitch, arbitrary cone-angle, and 100% dose usage, Jun. 2004, Medical Physics, vol. 31, No. 6, p. 1623.*
Kachelrieβ, M., et al., Flying Focal Spot (FFS) in Cone-Beam CT, 5 pages, Institute of Medical Physics (IMP), Univeristy of Erlangen-Nürnberg, Erlangen, Germany.
Köhler, T., et al., Artifact analysis of approximate helical cone-beam CT reconstruction algorithms, Jan. 2002, pp. 51-64, vol. 29, No. 1, American Assicoation of Physicists in Medicine.
Flohr, T. G., et al.; Image reconstruction and image quality evaluation for a 64-slice CT scanner with z-flying focal spot; 2005; Med. Phys.; 32(8)2536-2547.
Shechter, G., et al.; A Re-binning Algorithm for Cardiac CT; 2006; IEEE Symposium on Biomedical Imaging: Macro to Nano; pp. 1176-1179.

* cited by examiner

*Primary Examiner*—Edward J Glick
*Assistant Examiner*—John M Corbett

(57) ABSTRACT

A tomographic apparatus includes a radiation source (12) having a plurality of focal spots ($F_a$, $F_b$, $F_c$, $F_d$) and a detector (20) which generates output signals indicative of radiation received along a plurality of rays. A height rebinner (34) performs a height rebinning of the acquired rays to generate height interpolated readings. A transverse rebinner (36) performs a two-dimensional transverse interpolation of the height interpolated rays in a canonical space to generate a plurality of transversely interpolated readings (302). The transversely interpolated readings (302) are reconstructed to generate a human readable image.

22 Claims, 4 Drawing Sheets

REBINNING FOR COMPUTED TOMOGRAPHY IMAGING

CROSS REFERENCE TO RELATED APPLICATIONS

This application claims the benefit of U.S. provisional application Ser. No. 60/596,150 filed Sep. 2, 2005, which is incorporated herein by reference.

The present invention relates to computed tomography (CT) imaging. It finds particular application to multiple focal spot acquisition techniques. It also finds application to cardiac and other applications where it is desirable to improve the visualization of anatomical structures and to suppress streaks and other artifacts in reconstructed images.

Increasing resolution in cardiac cone beam CT has the potential to improve the quality of coronary artery imaging. One way to obtain improved resolution is to modulate the focal spot in both the transversal and the longitudinal directions. However, the finite dynamic range of the detector elements and possible electronic noise limit the angular sampling rate. This problem is exacerbated as the gantry rotation speed increases.

As a result, acquiring data from a plurality of focal spot positions has required reducing the number of frames acquired per gantry rotation. This in turn can lead to streak artifacts and degrade the transverse spatial resolution in the reconstructed images. Accordingly, it would be desirable to obtain the benefits of multiple focal spot techniques while reducing the deleterious effects resulting from reducing the number of frames acquired per rotation.

In addition, conventional transversal re-binning techniques used with parallel-geometry 3D back-projection cone beam CT reconstruction algorithms have followed a two step process. In the first step, the acquired rays have been rebinned into non-equidistant parallel rays. In the second step, a one dimensional radial interpolation has been performed on the non-equidistant parallel rays to generate equidistant parallel rays. This two step interpolation process has led to inaccuracies which have caused smearing and other artifacts in the reconstructed image. These errors are further exacerbated as the angular sampling is reduced. Accordingly, it would be desirable to reduce the inaccuracies introduced by the fan to parallel rebinning process, especially in situations where angular sampling rate is limited.

Aspects of the present invention address these matters, and others.

According to a first aspect of the present invention, a tomographic apparatus includes a radiation source which rotates about an imaging region, a radiation sensitive detector which detects radiation emitted by the radiation source and generates output signals indicative of radiation received along a plurality of rays, a transverse rebinner which interpolates the output signals to generate transversely interpolated readings, and a reconstructor which reconstructs the transversely interpolated readings to generate a human readable image. The radiation source includes at least first and second focal spots, and the interpolation includes weighting the output signals as a function of their two-dimensional canonical distance from the transversely interpolated readings.

According to a more limited aspect of the invention, the interpolation includes calculating a weighted average of output signals indicative of radiation received along rays which are located nearest the transversely interpolated readings in the canonical space.

According to a still more limited aspect of the invention, the tomographic apparatus has a transverse field of view having a radial dimension. The interpolation includes rescaling the canonical distance as a function of the radial dimension.

According to a another limited aspect of the invention, the interpolation includes interpolating output signals indicative of rays originating from both of the first and second focal spots.

The apparatus may also include a height rebinner which interpolates the output signals to generate height rebinned readings, and the transverse rebinner may interpolate the height rebinned readings.

According to a yet more limited aspect of the invention, the z-coordinate of the height interpolated readings is the z-coordinate at which the height interpolated readings intersect a cylindrical surface having a longitudinal axis which passes through a nominal focal spot. The curved surface interest may intersect the isocenter.

According to a still more limited aspect of the invention, the detector includes a plurality of rows of detector elements extending in the z-direction. The distance between the height interpolated readings is equal to the distance between the center rows of the detector.

According to another limited aspect of the invention, the first and second focal spots have different z-coordinates. The reconstructor reconstructs the transversely interpolated reading based on the average z-coordinate of the first and second focal spots. The x-ray source may have more than two focal spots, for example three, four, or more.

According to another aspect of the present invention, a computed tomography reconstruction method includes performing a two-dimensional transverse interpolation of a plurality of rays acquired in a computed tomography scan to generate a transversely interpolated reading, repeating the step of performing a two-dimensional transverse interpolation a plurality of times to generate a plurality of transversely interpolated readings, and reconstructing the transversely interpolated readings to generate a human readable image. The acquired rays and the interpolated reading each have a location in a canonical space, and the interpolation includes weighting the acquired rays as a function of their distance from the transversely interpolated reading in the canonical space.

According to a limited aspect of the invention, the plurality of transversely interpolated readings are located in the canonical space so as to form a plurality of equidistant parallel projections. According to a more limited aspect of the invention, the interpolation may include calculating the weighted average of the n acquired rays located nearest the transversely interpolated reading in the canonical space. N is preferably a number greater than or equal to four.

According to another more limited aspect of the invention, the method further includes rescaling at least one of the canonical coordinates of the acquired ray.

According to a limited aspect of the invention, the method includes performing a longitudinal interpolation of the acquired rays to generate longitudinally interpolated readings. Performing a two-dimensional transverse interpolation includes performing a two-dimensional transverse interpolation of a plurality of longitudinally interpolated readings having a common z-coordinate.

According to a yet more limited aspect of the invention, the acquired rays originate from an x-ray source having first and second focal spots. Performing a longitudinal interpolation includes separately interpolating rays originating from the first focal spot and rays originating from the second focal spot. According to a still more limited aspect of the invention, the acquired rays originate from an x-ray source having first, second, third, and fourth focal spots, and performing a longitudinal interpolation includes separately interpolating rays originating from each of the focal spots.

According to another more limited aspect of the invention, the z-coordinate of the longitudinally interpolated readings is the z-coordinate at which the readings intersect a surface which intersects the field of view of a CT scanner used to acquire the rays.

According to another more limited aspect of the invention, the surface intersects the isocenter of the field of view. According to a yet more limited aspect of the invention, the surface is a cylindrical surface having a longitudinal axis which intersects the nominal focal spot position.

An advantage of an aspect of the present invention is that a relatively accurate transverse interpolation may be performed.

Another advantage of an aspect of the present invention is that the angular and radial smearing resulting from the transverse interpolation can be balanced.

Another advantage of an aspect of the present invention image artifacts may be reduced while providing improved transverse spatial resolution.

Another advantage of an aspect of the present invention is that height rebinning may be performed while preserving the transverse coordinates of the interpolated rays.

Another advantage of an aspect of the present invention is that the reconstruction of data obtained from multiple focal spots is simplified while providing good accuracy.

Still other advantages and benefits will be appreciated by those skilled in the art upon reading and understanding the appended description.

Figure 1:
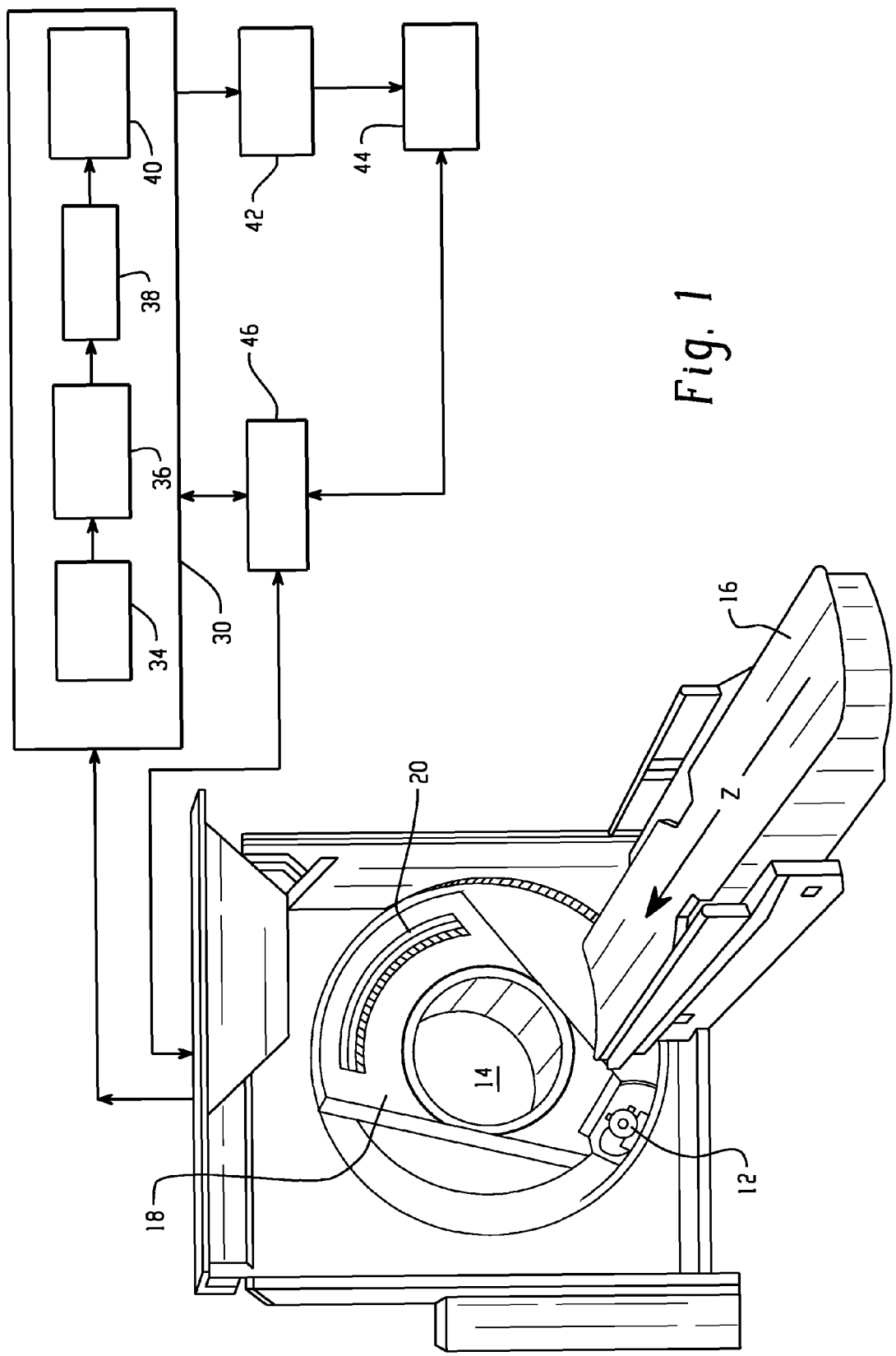
FIG. 1 is a block diagram of a CT system.

With reference to FIG. 1, a CT scanner 10 includes a rotating gantry 18 which rotates about the z-axis. The gantry 18 supports an x-ray source 12 such as an x-ray tube which generates a generally conical radiation beam. The x-ray source 12 includes a dynamic focal spot is rapidly shifted or deflected to a plurality of positions during rotation of the source 12. The gantry 18 also supports an x-ray sensitive detector 20 which subtends an angular arc on the opposite side of an examination region 14. The detector 20 is a multi-slice detector which includes multiple rows or slices of detector elements extending in the z-direction and multiple columns of detector elements extending in the transverse direction. The detector 20 generates output signals indicative of radiation received along plurality of rays. Flat panel or other detector 20 configurations, as well as fourth generation or other system geometries, may also be implemented.

A patient support 16 such as a couch supports the patient in the examination region 14. The patient support 16 is preferably movable in the z-direction. A controller 28 coordinates the various scan parameters as necessary to carry out a desired scan protocol, including x-ray source 12 parameters such as tube voltage, current, and focal spot position.

Data collected by the detector 20 is reconstructed to generate volumetric data indicative of the interior anatomy of the patient. A height or z-axis rebinner 34 performs a height rebinning of the rays acquired by the detector 20, a transverse rebinner 36 performs a transverse rebinning. A convolver 38 and a backprojector 40 cooperate to reconstruct the acquired data. The height rebinner 34, transverse rebinner 36, convolver 38, and backprojector 40 are preferably implemented as part of a reconstruction subsystem 30 associated with the scanner 10. These items may also be implemented in separate systems or computers.

An image processor 42 processes the volumetric image data generated by the reconstructor 30 for display in human readable form.

A general purpose computer serves an operator console 44. The console 44 includes a human readable output device such as a monitor or display and an input device such as a keyboard and mouse. Software resident on the console allows the operator to control the operation of the scanner 10 by establishing desired scan protocols, initiating and terminating scans, viewing and otherwise manipulating the volumetric image data, and otherwise interacting with the scanner 10.

Figure 2A:
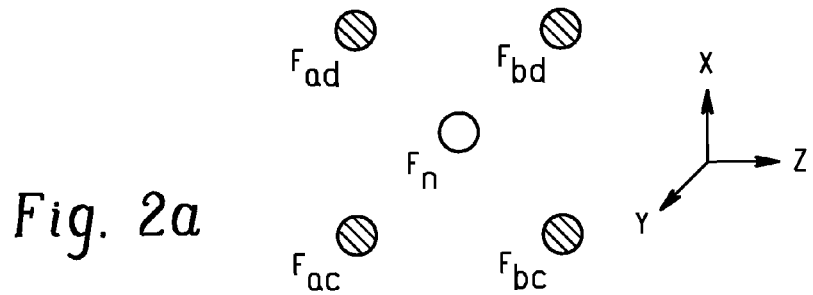
FIG. 2a depicts the focal spots of an x-ray tube in the x-z plane.

FIG. 2a depicts the geometry of the x-ray tube 12 focal spots in the trans-axial plane. The x-ray tube 12 includes four (4) focal spots $F_{ac}$, $F_{bc}$, $F_{ad}$, and $F_{bd}$, where a and b denote the location of the focal spot along the z-axis and c and d denote the location of the focal spot in the transverse plane. A nominal focal spot position $F_n$ is defined at the center of the actual focal spots $F_{ac}$, $F_{bc}$, $F_{ad}$, and $F_{bd}$.

Figure 2B:
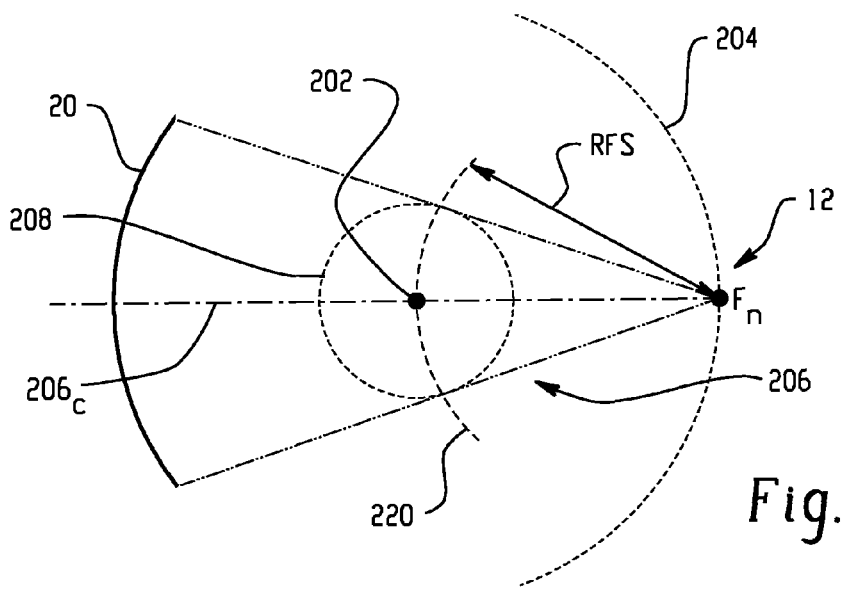
FIG. 2b depicts the geometry of an x-ray beam as viewed in the transverse plane.

FIG. 2b depicts the geometry of the generally conical x-ray beam 206 in the transverse or x-y plane. The tube 12, and hence the nominal focal spot $F_n$, rotate about an isocenter 202 along a circular trajectory 204, a segment of which is depicted. The tube 12 emits an x-ray beam 206 which is approximately coextensive with a field of view 208. A central ray $206_c$ passes through the isocenter 202 and is received by a central row of the detector 20. As the tube 12 rotates about the trajectory 204, the focal spot is rapidly shifted between the focal spots $F_{ac}$, $F_{bc}$, $F_{ad}$, and $F_{bd}$, with data received by the detector 12 collected separately for each focal spot position.

Figure 2C:
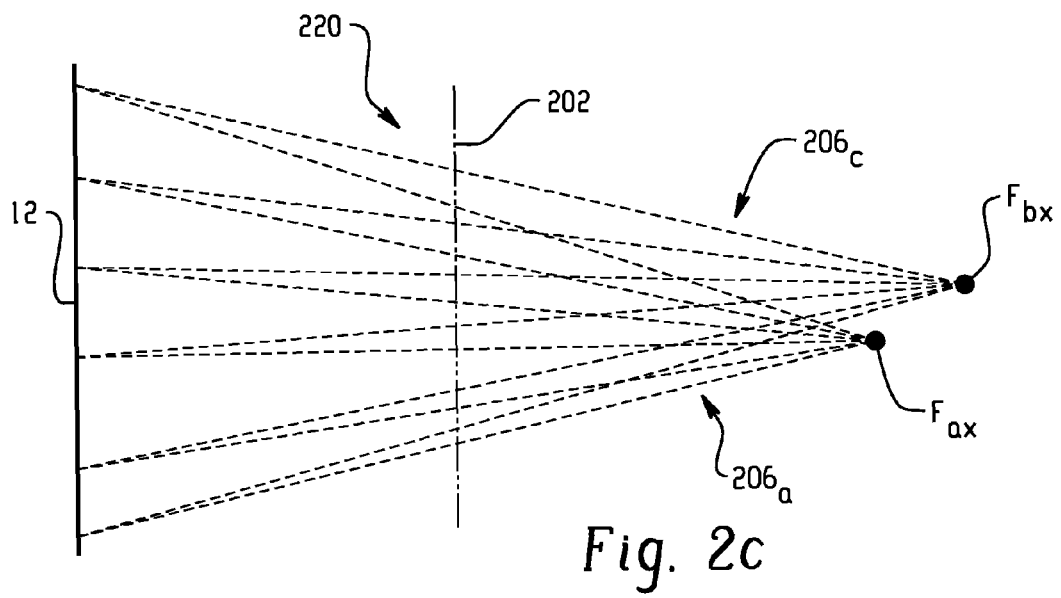
FIG. 2c depicts the geometry of an x-ray beam as viewed in the y-z plane.

FIG. 2c depicts the geometry of the generally conical x-ray beam 206 in the y-z plane for central rays which pass through the isocenter 202 and are received by a central column of the multi-row detector 12. The projection of the focal spots $F_{ac}$ and $F_{ad}$ is depicted as point $F_{ax}$ and the projection of the focal spots $F_{bc}$ and $F_{bd}$ is depicted as $F_{bx}$. The relative positions of the central rays of the x-ray beam 206 emitted from focal spots $F_{ax}$ and $F_{bx}$ are depicted at $206_a$ and $206_b$, respectively. As can be seen, the shift in focal spot positions results in imperfect interleaving at the isocenter 202.

With reference to both FIG. 1 and FIG. 2c, the height rebinner 34 performs a separate height interpolation for each focal spot position $F_{ac}$, $F_{bc}$, $F_{ad}$, and $F_{bd}$ and detector column. This preserves the transverse coordinates of the readings. The height rebinning will first be explained in connection with the central rays which intersect the isocenter 202 at various locations along the z-axis.

The central rays are interpolated in the z-direction to generate interpolated readings at desired locations along the z-axis. The distance between the interpolated readings is preferably selected to be the same as the distance between the middle rows of the multi-slice detector 20. Neglecting the shifting of the focal spot position, the input and output rasters then coincide, and height interpolation of the middle rows is not required. This avoids smearing due to the interpolation of the middle rows.

The z-coordinate of each ray to be interpolated is defined as the location at which the ray intersects the isocenter 202. The z-coordinate of the interpolated reading is likewise defined as the location at which the reading intersects the isocenter 202. While a separate height rebinning is performed for each z-axis focal spot position $F_{ac}$, $F_{bc}$, $F_{ad}$, and $F_{bd}$, the interpolated readings are approximated as having originated at the nominal focal spot position $F_n$.

As will be appreciated, only the central rays intersect the isocenter 202. Accordingly, the z-coordinates of the rays to be interpolated 206 and of the height interpolated readings are in practice defined in relation to their intersection with a curved surface or plane 220. FIG. 2c depicts the curved plane 202 projected into the transverse plane. The curved plane 220 can be visualized as a portion of the surface of a cylinder having a longitudinal axis which intersects the nominal focal spot $F_n$ and a radius RFS, where RFS is the radius of the focal spot trajectory 202 (i.e., the distance in the transverse plane at the longitudinal position of the nominal focal spot $F_n$). Thus, the z-coordinates are defined in relation to their intersection with the cylindrical surface 220.

One advantage of defining the curved plane 220 as intersecting the isocenter 202 is that the interpolation error is zero at the isocenter, while reaching a maximum at the edges of the field of view 208. Of course, it is not necessary for the curved plane 220 to intersect the isocenter 202, and other suitable surfaces or functions may also be implemented.

The height interpolation is performed separately for each focal spot position $F_{ac}$, $F_{bc}$, $F_{ad}$, $F_{bd}$ and detector column so as to generate an output raster of one-dimensionally interpolated values for each detector column and focal spot position. The process is repeated for data acquired at a plurality of source 12 positions resulting from the rotation of the source 12 about the z-axis.

It should also be noted that it is not necessary to interleave the rays originating from different focal spot positions prior to performing the height interpolation. While performing separate interpolations or rays originating from the various focal spots results in a less dense input raster, the input readings from the various focal spots (i.e., the readings that are to be interpolated), are still interleaved at the isocenter 202, as can be seen in FIG. 2c. The resulting incoherence effect helps to suppress windmill artifacts while still providing good z-axis resolution.

Returning to FIG. 1, the transverse rebinner 36 receives the height interpolated readings and performs a transversal rebinning to generate a plurality of equidistant parallel views. The transverse rebinning is performed on a row-by-row basis. Stated another way, the transverse rebinning is performed separately for the height interpolated readings having different z-coordinates.

Figure 3A:
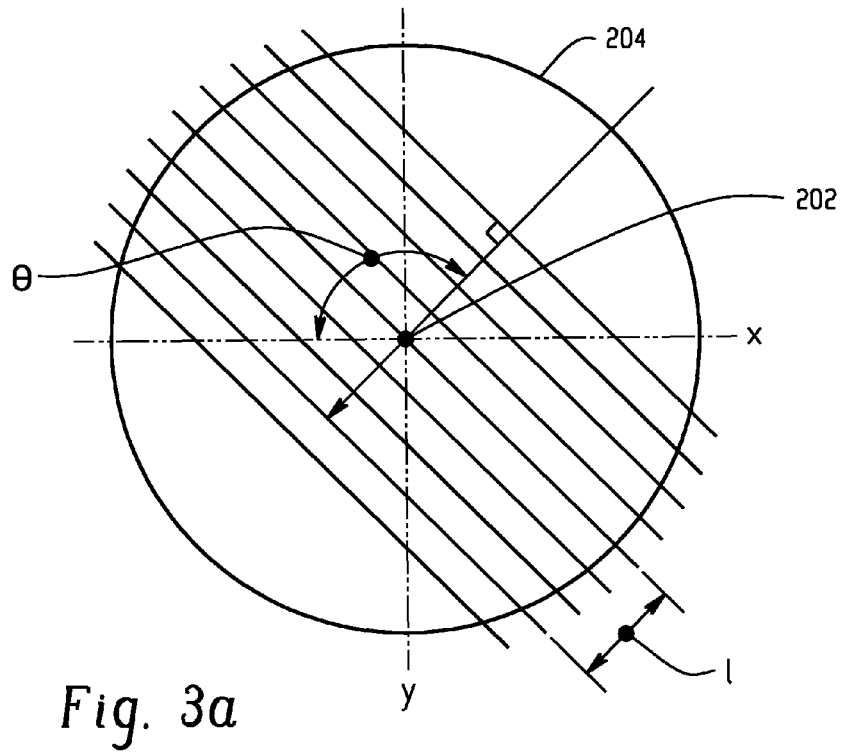
FIG. 3a depicts the angular and linear coordinates of a canonical coordinate system.
Figure 3B:
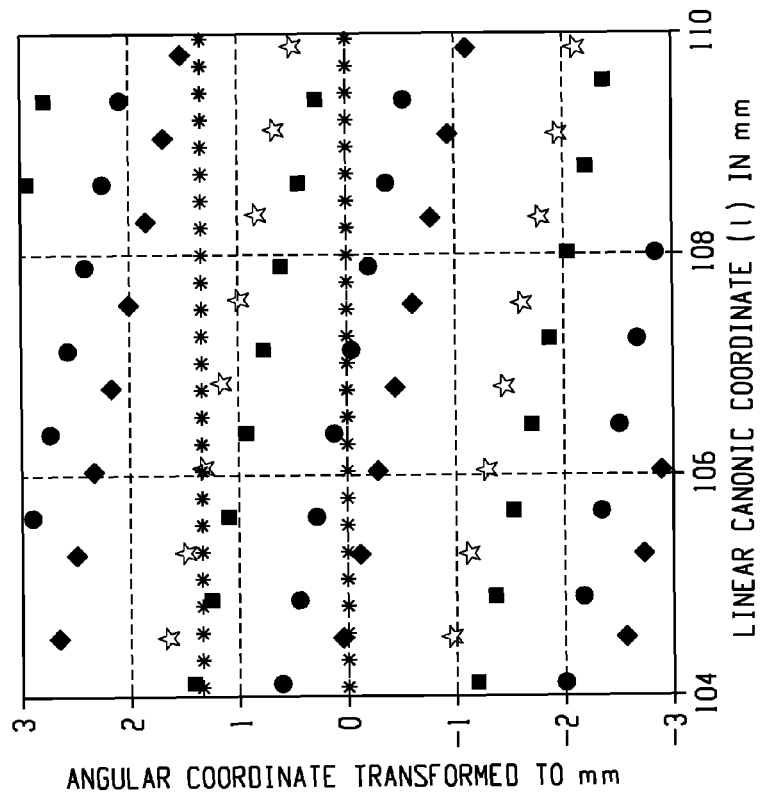
FIG. 3b depicts the transverse rebinning in canonical coordinates.
Figure 3B:
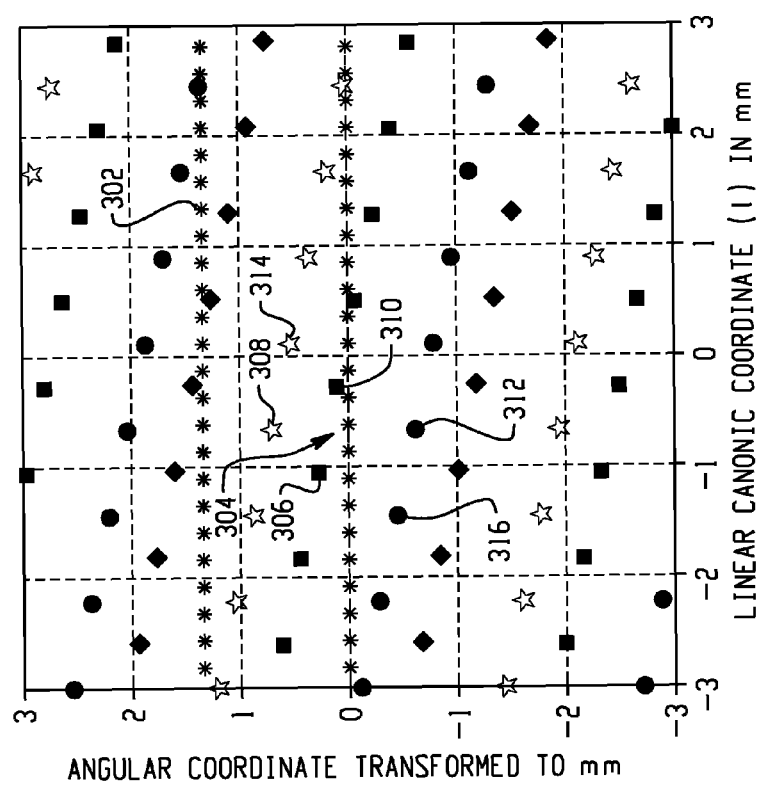

With reference to FIG. 3a, the location of a ray or reading can be expressed in a canonical coordinate system. A first coordinate represents the angle θ of the reading with respect to the x-axis 202. A second coordinate represents the radial distance 1 of the reading with respect to the isocenter. The canonical representation of rays which would be acquired in an exemplary acquisition are plotted in FIG. 3b, with different shapes used to mark rays originating from the focal spots $F_{ac}$, $F_{bc}$, $F_{ad}$, $F_{bd}$. The abscissa represents the linear canonic coordinate 1 in millimeters, while the ordinate represents the angular coordinate θ rescaled to millimeters. The asterisks 302 represent the canonical locations of desired transversely interpolated readings. The locations of the transversely interpolated readings are preferably selected to form a plurality of equidistant parallel views.

The view angle θ is preferably rescaled or transformed to balance the smearing in the x-y plane resulting from the interpolation in the angular and linear directions. By avoiding giving too large a weight to rays which would otherwise be located relatively farther from the interpolated reading, balancing between the angular and linear smearing can lead to a reduction of image artifacts while improving the transverse spatial resolution. In one embodiment, the angular coordinate θ can be expressed in millimeters using a scaling coefficient that is a function of the radius of the scan FOV 208. The rescaling is performed so that the smearing at the edges of the transverse field of view 208 resulting from interpolating along the linear and angular axes is approximately equal.

Figure 4:
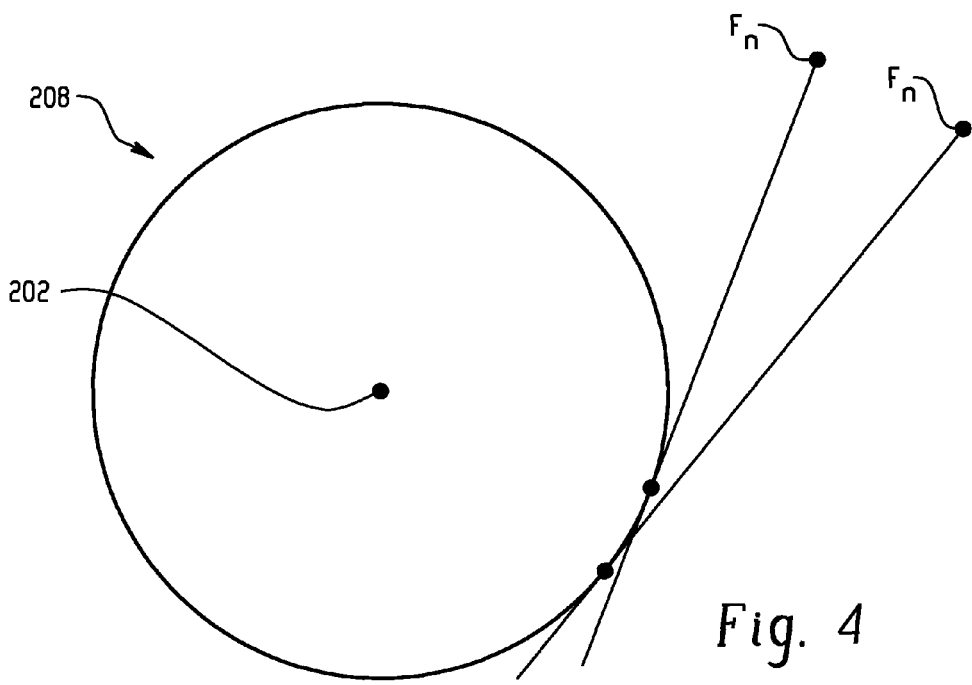
FIG. 4 depicts the geometry of an angular to linear rescaling.

With reference to FIG. 4, in which the geometry is shown in greatly exaggerated form, two rays 302, 304 which are received by the same detector but at successive integration times or frames are shown. The two rays 302, 304 are assumed to originate at the nominal focal spot position $F_n$. The distance D between the two rays at their intersection with the transverse field of view 208 gives a reasonable approximation of the smearing due to the interpolation along the angular direction at the edge of the field of view 208. The smearing will be reduced nearer to the isocenter 202. The distance D and hence the scaling factor can be approximated as follows:

$$D = \frac{2\pi r}{f} \qquad \text{Eq. 1}$$

where r is the radius of the transverse field of view, and f is the number of frames per rotation of the x-ray source 12. Thus, for a 250 mm field of view and a sampling of 330 frames per rotation, a suitable scaling factor is approximately 2.38 millimeter/degree.

Of course, other approaches may be used to scale the two axes. In another approach, the scaling is selected so that the smearing is not equal. In still another approach, the desired smearing is achieved other than at the edge of the field of view 208. Moreover, the scaling need not be linear and may vary as a function of the angular position. Of course, the same results may be achieved by rescaling along the linear axis instead of the angular axis, or along both axes.

The transverse rebinner 36 performs a two dimensional interpolation based on the value and distance between the rays to be interpolated and the desired interpolated reading in the canonical space. In one embodiment, the interpolation is performed by calculating the weighted average of the n rays which are located nearest to the desired transversely interpolated reading. An exemplary interpolation for a desired interpolated reading 304 and where n=6 would calculate the weighted average based on the six nearest acquired rays 306, 308, 310, 312, 314, 316. Each acquired ray is weighted in monotonically decreasing relation to its canonical distance from the desired interpolated view. Thus, ray 310 would be weighted more heavily than ray 306, which would be weighted more heavily than ray 312, and so on. The weighted average is preferably performed so that the first order moment (i.e., the sum over the rays of the weight times the vectors of displacement between each ray and the interpolated reading) will be zero.

In another embodiment, the weighted average of the acquired rays is performed by grouping the n neighbors into all the possible subgroups of four rays. A bilinear interpolation is performed on each subgroup, with the result of each bilinear interpolation stored separately. A weighted average is then calculated over the results obtained from interpolating the different sub-groups, giving higher weights to the results located nearer to the desired interpolated reading. Again, the rays located nearer to the desired reading are weighted more heavily than those more distant therefrom. Due to the nature of the bilinear interpolation, the first order moment is zero because the first moment from the contribution from every subgroup is zero.

Of course, the weighted average may be performed using different numbers n of acquired rays. In another example, n is equal to four. Moreover, other calculation and weighting techniques may be implemented.

The convolver 38 convolves the rebinned readings using a conventional ramp filter as is well known in the art. Similarly, the backprojector 40 performs the backprojection using a suitable backprojection algorithm. The backprojector 40 uses the average z-coordinate of the focal spots $F_a$, $F_b$, $F_e$, $F_d$ (i.e. the z-coordinate of the nominal focal spot $F_n$) as the z-coordinate of the origin of the rebinned readings. Stated another way, the reconstructor assumes that the rebinned readings originated from the nominal focal spot $F_n$. The error δz resulting from this approximation can be calculated as follows:

$$\delta z \leq \frac{SW \cdot (RD + RS) \cdot (r - RFS)}{4 \cdot RD \cdot RFS} \quad \text{Eq. 2}$$

where SW is the collimated slice width, RD is the minimum distance between the detector 20 and the isocenter 202, RFS is the radius of the focal spot trajectory 204, RS is the radius of the scan field of view 208, and r is the transverse distance between the point on the reading and the reading origin. The error δz vanishes at the isocenter and is less than about 0.15 mm at the edges of the FOV for typical system geometries.

While the above description has focused on an x-ray source having four focal spots $F_{ac}$, $F_{bc}$, $F_{ad}$, $F_{bd}$, the technique may also be implemented in connection with dual focal spot sources or source having other greater or smaller numbers of focal spots. Where the focal spots have the same z-coordinate, such as in a dual focal spot system in which the focal spot is shifted in the transverse plane, the height rebinner 34 may be omitted. The technique may also be implemented in connection with configurations where the focal spot positions are not aligned with the coordinate system of the scanner. In a dual focal spot system, for example, the technique may be implemented in connection with so-called diagonal configurations where the focal spots have different z and transverse coordinates. The transverse rebinning may also be used in connection with sources having a single focal spot.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

The invention claimed is:

1. A tomographic apparatus comprising:
    a radiation source which rotates about an imaging region, wherein the radiation source includes first and second focal spots;
    a radiation sensitive detector which detects radiation emitted by the radiation source and generates output signals indicative of radiation received along a plurality of rays;
    a transverse rebinner which interpolates the output signals to generate transversely interpolated readings, wherein the interpolation includes weighting the output signals as a function of their two-dimensional canonical distance from the transversely interpolated readings;
    a reconstructor which reconstructs the transversely interpolated readings to generate a human readable image.

2. The apparatus of claim 1 wherein the interpolation includes calculating a weighted average of output signals indicative of radiation received along rays which are located nearest the transversely interpolated readings in the canonical space.

3. The apparatus of claim 2 wherein the tomographic apparatus has a transverse field of view having a radial dimension and wherein the interpolation includes rescaling the canonical distance as a function of the radial dimension.

4. The apparatus of claim 1 wherein the interpolation includes interpolating output signals indicative of rays originating from both of the first and second focal spots.

5. The apparatus of claim 4 further including a height rebinner which interpolates the output signals to generate height rebinned readings and wherein the transverse rebinner interpolates the height rebinned readings.

6. The apparatus of claim 5 wherein the z-coordinate of the height interpolated readings is the z-coordinate at which the height interpolated readings intersect a curved surface having a longitudinal axis which passes through a nominal focal spot.

7. The apparatus of claim 6 wherein the tomographic apparatus has a field of view having an isocenter and wherein the curved surface intersects the isocenter.

8. The apparatus of claim 7 wherein the detector includes a plurality of rows of detector elements extending in the z-direction and wherein the distance between the height interpolated readings is equal to the distance between the center rows of the detector.

9. The apparatus of claim 1 wherein the first and second focal spots have different z-coordinates and the reconstructor reconstructs the transversely interpolated reading based on the average z-coordinate of the first and second focal spots.

10. The apparatus of claim 9 wherein the x-ray source includes third and fourth focal spots.

11. A computed tomography reconstruction method comprising:
    performing a two-dimensional transverse interpolation of a plurality of rays acquired in a computed tomography scan to generate a transversely interpolated reading, wherein the acquired rays and the interpolated reading each have a location in a canonical space, and wherein the interpolation includes weighting the acquired rays as a function of their distance from the transversely interpolated reading in the canonical space;
    repeating the step of performing a two-dimensional transverse interpolation a plurality of times to generate a plurality of transversely interpolated readings;
    reconstructing the transversely interpolated readings to generate a human readable image.

12. The method of claim 11 wherein the plurality of transversely interpolated readings are located in the canonical space so as to form a plurality of equidistant parallel projections.

13. The method of claim 12 wherein the interpolation includes calculating the weighted average of the n acquired rays located nearest the transversely interpolated reading in the canonical space, and wherein n is a number greater than or equal to four.

14. The method of claim 13 wherein the method further includes rescaling at least one of the canonical coordinates of the acquired rays.

15. The method of claim 11 including performing a longitudinal interpolation of the acquired rays to generate longitudinally interpolated readings and wherein performing a two-dimensional transverse interpolation includes performing a two-dimensional transverse interpolation of a plurality of longitudinally interpolated readings having a common z-coordinate.

16. The method of claim 15 wherein the acquired rays originate from an x-ray source having first and second focal spots and wherein performing a longitudinal interpolation includes separately interpolating rays originating from the first focal spot and rays originating from the second focal spot.

17. The method of claim 15 wherein the acquired rays originate from an x-ray source having first, second, third, and fourth focal spots and wherein performing a longitudinal interpolation includes separately interpolating rays originating from each of the focal spots.

18. The method of claim 15 wherein the z-coordinate of the longitudinally interpolated readings is the z-coordinate at which the readings intersect a surface which intersects the field of view of a CT scanner used to acquire the rays.

19. The method of claim 18 wherein the surface intersects the isocenter of the field of view.

20. The method of claim 18 wherein the surface is a cylindrical surface having a longitudinal axis which intersects the nominal focal spot position ($f_n$).

21. An apparatus comprising:
   means for performing, for each of a plurality of transversely interpolated readings, a two-dimensional transverse interpolation of a plurality of rays acquired in a computed tomography scan to generate the transversely interpolated reading, wherein the interpolation includes weighting the acquired rays as a function of their two-dimensional canonical distance from the transversely interpolated reading;
   means for reconstructing the transversely interpolated readings to generate a human readable image.

22. The apparatus of claim 21 including means for performing a longitudinal interpolation of the acquired rays to generate longitudinally interpolated readings and wherein the means for performing performs a two-dimensional transverse interpolation of longitudinally interpolated readings having a common z-coordinate.

* * * * *